United States Patent
Cordier

(10) Patent No.: US 8,811,894 B2
(45) Date of Patent: *Aug. 19, 2014

(54) NFC CARD FOR HANDHELD DEVICE

(75) Inventor: Nicolas Cordier, Luynes (FR)

(73) Assignee: INSIDE Secure, Aix-en-Provence Cedex (FR)

( * ) Notice: Subject to any disclaimer, the term of this patent is extended or adjusted under 35 U.S.C. 154(b) by 144 days.

This patent is subject to a terminal disclaimer.

(21) Appl. No.: 13/232,346

(22) Filed: Sep. 14, 2011

(65) Prior Publication Data

US 2012/0071088 A1 Mar. 22, 2012

(30) Foreign Application Priority Data

Sep. 21, 2010 (FR) ...................................... 10 03752
Sep. 21, 2010 (FR) ...................................... 10 03754

(51) Int. Cl.
*H04B 5/00* (2006.01)

(52) U.S. Cl.
USPC ........................................................ 455/41.1

(58) Field of Classification Search
CPC .. G06K 19/07771; H04B 5/0031; H04B 7/26; H04B 5/00; H04B 5/0025; H04B 5/02; H04B 5/0012; H04B 5/0037; H04B 5/0043; H04B 5/0006; H04B 5/005; H04B 5/0062; H04B 5/0075; H04B 5/0081; H04B 5/0087; H04B 5/0093; H04B 7/00
USPC ............................................. 455/41.1, 41.2
See application file for complete search history.

(56) References Cited

U.S. PATENT DOCUMENTS

| 5,453,748 | A | 9/1995 | Lindell | |
|---|---|---|---|---|
| 5,736,858 | A * | 4/1998 | Katznelson et al. | .......... 324/318 |
| 7,098,770 | B2 | 8/2006 | Charrat et al. | |
| 7,106,246 | B1 | 9/2006 | Lindell | |
| 7,541,930 | B2 * | 6/2009 | Saarisalo et al. | ........... 340/572.7 |
| 7,991,434 | B2 * | 8/2011 | Yen et al. | ....................... 455/558 |
| 8,159,223 | B2 * | 4/2012 | Luekeke et al. | ............... 324/318 |
| 8,200,152 | B2 * | 6/2012 | Watanabe | .................... 455/41.1 |

(Continued)

FOREIGN PATENT DOCUMENTS

DE 102007061361 A1 1/2009
EP 1 327 222 B1 7/2003

(Continued)

OTHER PUBLICATIONS

Search Report issued Mar. 23, 2011 in FR Application No. 1003752; Written Opinion.

(Continued)

*Primary Examiner* — Andrew Wendell
*Assistant Examiner* — Maryam Soltanzadeh
(74) *Attorney, Agent, or Firm* — Panitch Schwarze Belisario & Nadel LLP

(57) ABSTRACT

An NFC card includes an antenna circuit including an antenna coil having at least one magnetic axis, and at least one integrated circuit linked to the antenna circuit. The magnetic axis of the antenna coil is substantially parallel to at least one side of the card, and the card further includes at least one electrically conductive screen extending near the antenna coil, which does not cross the magnetic axis. The card does not include any magnetically permeable material between the at least one conductive screen and the antenna coil. Embodiments of the invention are applicable in particular to SIM-NFC card and SD-NFC cards.

15 Claims, 4 Drawing Sheets

(56) References Cited

U.S. PATENT DOCUMENTS

| | | | |
|---|---|---|---|
| 8,594,566 B2* | 11/2013 | Zhu et al. | 455/41.1 |
| 8,643,473 B2* | 2/2014 | Suzuki | 340/10.1 |
| 8,660,487 B2* | 2/2014 | Kargl et al. | 455/41.2 |
| 2007/0023517 A1 | 2/2007 | Tan et al. | |
| 2009/0108063 A1 | 4/2009 | Jain et al. | |
| 2009/0284377 A1 | 11/2009 | Tuttle et al. | |

FOREIGN PATENT DOCUMENTS

| | | |
|---|---|---|
| EP | 1801741 A2 | 6/2007 |
| EP | 2211295 A2 | 7/2010 |
| WO | 9858509 A1 | 12/1998 |
| WO | 0167625 A1 | 9/2001 |

OTHER PUBLICATIONS

Search Report issued Jul. 28, 2011 in FR Application No. 1151552; Written Opinion.

ISO Standard 15693, Part 2: "Identification cards—Contactless integrated circuit cards—Vicinity cards—Air interface and initialization," published 2006 by the International Organization for Standardization, 14 pages.

ISO Standard 15693, Part 3: "Identification cards—Contactless integrated circuit cards—Vicinity cards—Anticollision and transmission protocol," published 2009 by the International Organization for Standardization, 43 pages.

ISO Standard 14443, Introduction: "An introduction to the contactless standard for smart cards and its relevance to customers," published by the International Organization for Standardization, 9 pages.

ISO Standard 14443, Part 2: "Identification cards—Contactless integrated circuit cards—Proximity cards—Radio frequency power and signal interface," published 2010 by the International Organization for Standardization, 24 pages.

ISO Standard 14443, Part 3: "Identification cards—Contactless integrated circuit cards—Proximity cards—Initialization and anticollision," published 2011 by the International Organization for Standardization, 60 pages.

ISO Standard 14443, Part 4: "Identification cards—Contactless integrated circuit cards—Proximity cards—Transmission protocol," published 2008 by the International Organization for Standardization, 37 pages.

ISO Standard 18092: "Information technology—Telecommunications and information exchange between systems—Near Field Communication—Interface and Protocol," published 2004 by the International Organization for Standardization, 58 pages.

ISO Standard 7816, Part 3: "Identification cards—Integrated circuit cards—Cards with contacts—Electrical interface and transmission protocols," published 2006 by the International Organization for Standardization, 50 pages.

ISO Standard 7816, Part 4: "Identification cards—Integrated circuit cards—Organization, security and commands for interchange," published 2005 by the International Organization for Standardization, 83 pages.

Search Report issued Jul. 18, 2011 in FR Application No. 1003754; Written Opinion.

\* cited by examiner

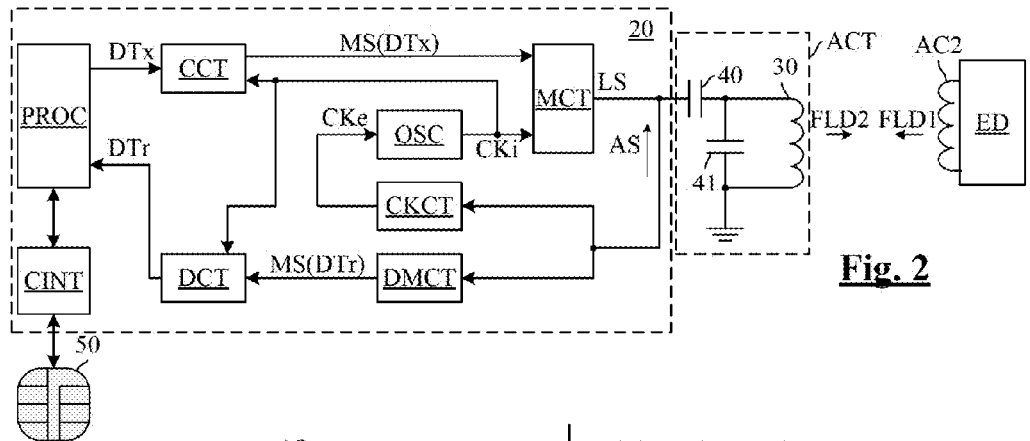
Fig. 2
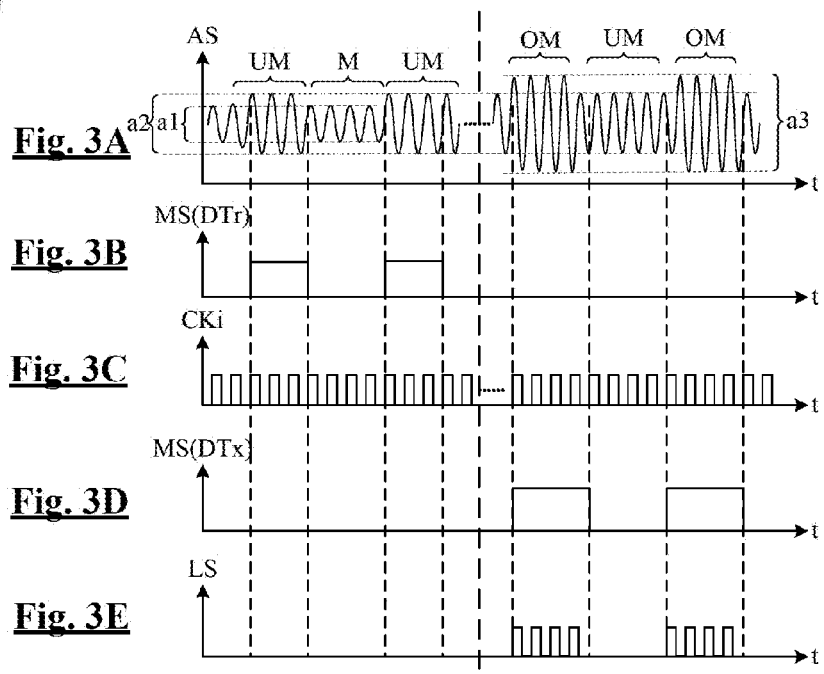
Fig. 3A
Fig. 3B
Fig. 3C
Fig. 3D
Fig. 3E
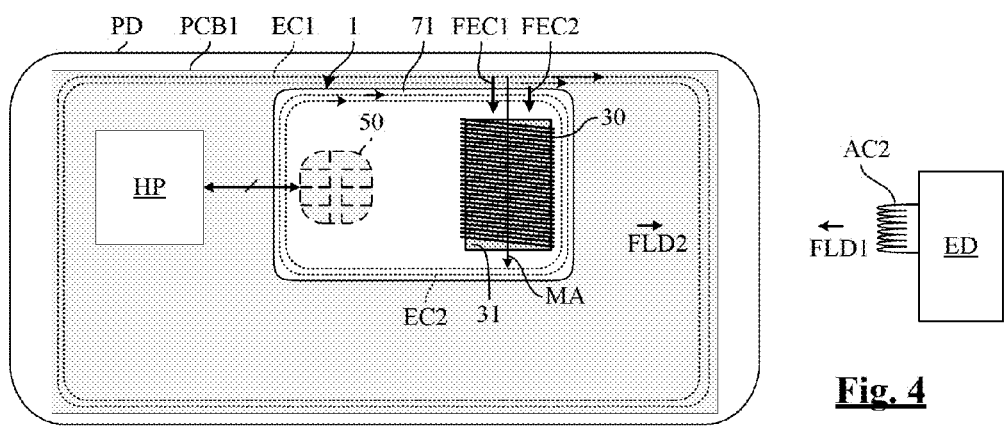
Fig. 4

NFC CARD FOR HANDHELD DEVICE

BACKGROUND OF THE INVENTION

Embodiments of the present invention relate to Near Field Communications cards (NFC cards), and more particularly to NFC cards intended to be inserted within a handheld device such as a mobile telephone. Embodiments of the present invention also relate to a method for performing a contactless communication between an NFC card and an external NFC device.

Known NFC cards intended to be inserted within handheld devices are for example NFC Subscriber Identity Modules, also called SIM-NFC, or NFC Secure Digital (SD) cards. International Publication WO 98/58509 discloses a SIM-NFC card including contact pads, a microprocessor, an NFC module, and an antenna coil. The antenna coil has one or more coplanar coaxial windings parallel to the plane of the card, and therefore presents a magnetic axis perpendicular to the plane of the card. It can perform contact communications with the mobile telephone through the contact pads and an NFC communication with an external NFC device through the antenna coil.

When the card and the external NFC device are placed sufficiently close to each other, the antenna coil of the card is inductively coupled to an antenna coil of the external NFC device, and data can be exchanged using conventional NFC techniques such as those defined by standards ISO 14443, ISO 15693, and Sony Felica.

In most applications, the external device emits a magnetic field while the NFC card is passive and sends data by load modulation. To that end, the antenna coil of the card is associated with passive components (e.g. capacitors) to form an antenna circuit tuned to a working frequency of the external device, for example 13.56 MHz.

Handheld devices often contain metal parts or metal components. When an NFC card is inserted in a handheld device, such metal parts or components reduce the inductance of the antenna coil, thereby altering the tuning frequency of the antenna circuit and reducing the maximum communication distance between the NFC card and the external device.

It is difficult for NFC card manufacturers to know in advance in what conditions an NFC card will be used, that is, what will be the metallic environment of the card. The location for the card may vary widely from handheld device to handheld device. The location may be more or less electromagnetically shielded, and the handheld device may include a variable number of metal parts that are close to the card. Consequently, the maximum communication distance of the card depends heavily on the environment around the card and may vary greatly depending on the handheld device within which the card is inserted.

Additionally, handheld devices are sometimes designed so that the NFC cards are placed underneath their battery, which may be the case, for example, when the connector receiving the card is mounted on the main printed circuit board of the handheld device (mother board). In this case, the battery may extend over the antenna coil and cross its magnetic axis. Consequently, the maximum communication distance is further diminished such that contactless communications become impossible or only possible with a very short communication distance.

In addition, the magnetic field emitted by external device induces eddy currents in the metal parts, which create a counter magnetic field that tends to neutralize the magnetic field, thereby reducing even more the maximum communication distance between the NFC card and the external device.

It may therefore be desired to provide an NFC card that offers a maximum communication distance less dependent on the environment surrounding the card, when the card is inserted in a handheld device.

BRIEF SUMMARY OF THE INVENTION

Embodiments of the invention relate to an NFC card including: an antenna circuit including an antenna coil having at least one magnetic axis, and at least one integrated circuit linked to the antenna circuit. In one embodiment, the magnetic axis of the antenna coil is substantially parallel to at least one side of the card, the card further includes at least one electrically conductive screen extending near the antenna coil, which does not cross the magnetic axis, and the card does not include any magnetically permeable material between the at least one conductive screen and the antenna coil.

In one embodiment, the antenna circuit has a tuning frequency which has been set in the presence of the at least one electrically conductive screen and does not detune when a metallic element is placed near the electrically conductive screen.

In one embodiment, the NFC card includes contact pads arranged on a first side of the card.

In one embodiment, the conductive screen extends on or near the first side of the card.

In one embodiment, the conductive screen extends on or near a second side of the card.

In one embodiment, the NFC card includes a first conductive screen extending on one side of the antenna coil without crossing its magnetic axis, and a second conductive screen extending on another side of the antenna coil without crossing its magnetic axis.

In one embodiment, the antenna coil is wound around a magnetically permeable core.

In one embodiment, the integrated circuit is configured to implement an active load modulation method including emitting bursts of magnetic field using the antenna coil when data are to be sent, in order to compensate the negative effect of the screen on the maximum communication distance offered by the card as far as the sending of data by load modulation is concerned.

In one embodiment, the antenna coil includes at least two coils in series, the coils having non-parallel magnetic axes, to enhance the sensing of a counter magnetic field generated by eddy currents when the card is arranged near a printed circuit board in the presence of an external magnetic field.

In one embodiment, the conductive screen includes at least one slot to reduce the effect of eddy currents circulating in the conductive screen in the presence of an external magnetic field.

In one embodiment, the conductive screen is split into at least two sub-screens to reduce the effect of eddy currents circulating in the conductive screen in the presence of an external magnetic field.

Embodiments of the invention also relate to a method for tuning an antenna coil of an NFC card, including the steps of providing a NFC card according to one embodiment of the invention, and setting a tuning frequency of the antenna circuit in the presence of the at least one electrically conductive screen.

Embodiments of the invention also relate to a method for performing a contactless communication between an NFC card and an NFC external device, including the steps of providing an NFC card according to one embodiment of the invention, setting a tuning frequency of the antenna circuit of the card in the presence of the at least one electrically conductive screen, emitting a first oscillating magnetic field with the external device, placing the card near the edges of a printed circuit board, and using the conductive screen to protect the tuning frequency of the antenna circuit against the detuning effect of the printed circuit board, to increase the maximum communication distance between the card and the external device.

In one embodiment, the method further includes sensing, with the antenna coil of the NFC card, a counter magnetic field generated by eddy currents in the printed circuit board, to increase the maximum communication distance between the card and the external device.

In one embodiment, the method further includes emitting bursts of a second oscillating magnetic field with the antenna coil of the NFC card, while the external device emits the first oscillating magnetic field, to transfer data from the card to the external device.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

Embodiments of the present invention will now be described in connection with, but not limited to, the appended drawings in which in the drawings:

FIG. 2 is an electrical diagram of an integrated circuit of the NFC card;

FIGS. 3A to 3E show different electrical signals illustrating the functioning of the NFC card;

FIG. 4 shows a first arrangement of the NFC card inside a handheld device;

DETAILED DESCRIPTION OF THE INVENTION

Figure 1A:
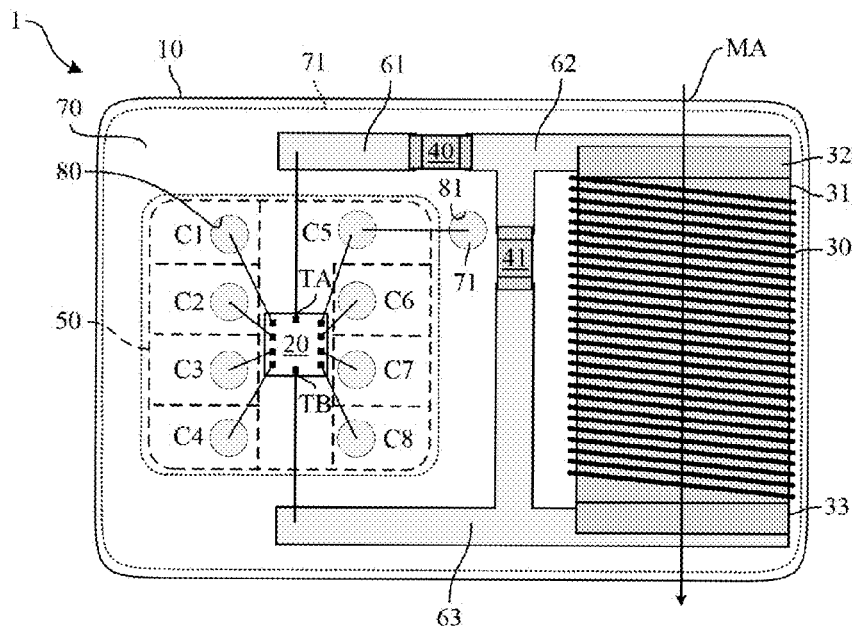
FIGS. 1A, 1B, 1C are respectively top, bottom, and cross-sectional views of a first embodiment of an NFC card according to the invention.
Figure 1B:
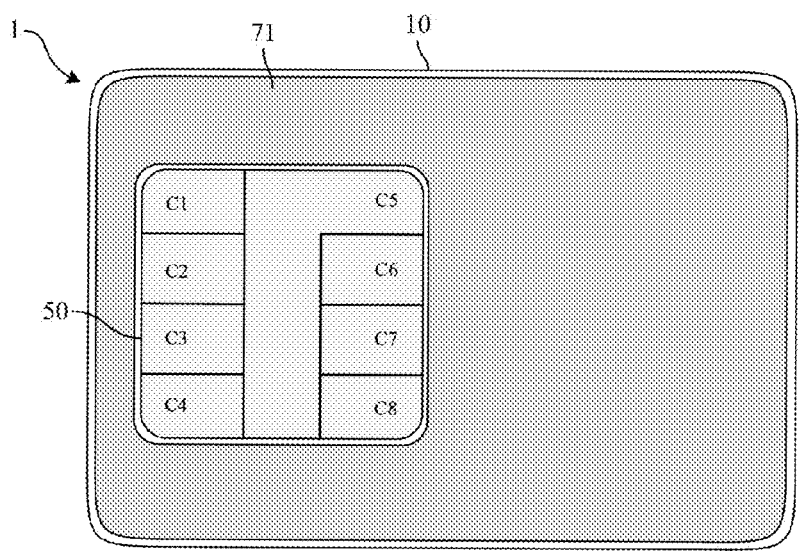
Figure 1C:
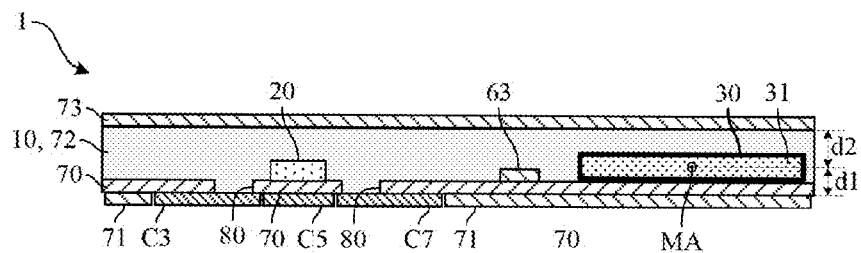

FIGS. 1A, 1B, 1C are respectively top, bottom, and cross-sectional views of an NFC card 1 according to the invention. The NFC card may be a SIM-NFC card intended to be inserted into a mobile phone. In FIG. 1A, internal elements of the card are shown through a material in which they are embedded.

The NFC card 1 includes a plastic body 10, an integrated circuit 20, a tuned antenna circuit including an antenna coil 30 and tuning capacitors 40, 41, and a group 50 of contact pads (shown in dashed lines). The integrated circuit 20 is a dual contact/contactless device and is designed to perform both contact and contactless communications. The integrated circuit 20 may be a secure integrated circuit for a SIM-NFC card.

The group 50 of contact pads includes eight conventional ISO 7816 contacts C1 (Vcc), C2 (RST), C3 (CLK), C4 (RFU), C5 (GND), C6 (Vpp), C7 (I/O), and C8 (RFU) to which terminals of the integrated circuit 20 are linked. The integrated circuit 20 has additional terminals TA, TB linked to the antenna coil and the capacitors 40, 41.

The antenna coil 30 has several coaxial non-coplanar windings and a magnetic axis MA which is substantially parallel to the plane of the card. By "substantially" it is meant that the magnetic axis MA is parallel to the plane of the card with a precision that depends on the process for manufacturing the card, for example ±10°.

The antenna coil 30 is preferably wound around a magnetically conductive core 31, and the core is preferably in a highly permeable material such as ferrite.

The card 1 also includes at least one electrically conductive screen, here two screens. A first screen 71 (FIGS. 1A, 1B, 1C) is arranged below the antenna coil 30 at a distance d1 from its magnetic axis. A second screen 73 (FIG. 1C) is arranged above the antenna coil 30 at a distance d2 from its magnetic axis. No magnetically conductive material, in particular no ferrite, is arranged between the antenna coil and the conductive screens.

In the embodiment shown in FIGS. 1A-1C, the first and second conductive screens 71, 73 are substantially planar and preferably oriented substantially parallel to the magnetic axis MA of the antenna coil. By "substantially parallel" it is meant that the screens are parallel to the magnetic axis MA with a precision that depends on the process for manufacturing the card, for example ±10°. The first and second conductive screens 71, 73 extend over the bottom and top sides of the card and cover almost the entire surfaces of the bottom and top faces. Each screen has a thickness that in some embodiments may be at least equal to the skin effect depth at the tuning frequency of the antenna circuit, for example approximately 18 μm for a 13.56 MHz tuning frequency. In one embodiment, at least one screen, for example screen 71, is connected to the ground potential of the integrated circuit.

As a general rule concerning the orientation of the conductive screens with respect to the magnetic axis MA of the antenna coil, the conductive screens must be arranged so that they do not cross the magnetic axis. This rule is met when the screens are planar and oriented substantially parallel to the magnetic axis MA.

The antenna circuit including the antenna coil 30 and the tuning capacitors 40, 41 is tuned to a specific working frequency, for example 13.56 MHz as required by standards ISO 14443, ISO 15693, and Sony Felica. The tuning is done in the presence of the electrically conductive screens 71, 73. The conductive screens 71, 73 will then protect the tuned antenna circuit from the detuning influence that metal parts may have on the tuning frequency once the card is arranged inside a handheld device such as a mobile phone.

In other words, given that the metallic environment surrounding the card is generally not known in advance and depends on the device in which the card is inserted, the conductive screens allow for a fixed known metal disturbance to be created near the antenna coil, and the antenna circuit to be tuned in presence of this metal disturbance. Therefore, the conductive screens 71, 73 create a "voluntary disturbance" of the antenna circuit which is taken into account when the antenna circuit is tuned, and will prevail over the disturbances from the metal parts in the device in which it will be inserted.

In the embodiment shown in FIGS. 1A-1C, the card 1 is made from a printed circuit board (PCB) including an electrically insulating dielectric substrate 70, and top and bottom electrically conductive layers arranged on the top and bottom faces of the substrate 70. The bottom conductive layer is etched to form the group 50 of contact pads C1-C8 and the screen 71, which are isolated from each other by gaps. The top conductive layer is etched to form conductive tracks 61, 62, 63.

Terminal TA of the integrated circuit 20 is wire bonded to the conductive track 61. Terminal TB of the integrated circuit 20 is wire bonded to the conductive track 63. Other terminals of the integrated circuit are wire bonded to the contact pads C1-C8 through openings 80 made in the substrate 70. Optionally, the first conductive screen 71 is wire bonded to ground pad C5, using a wire passing through a further opening 81 in the substrate 70 then passing through one of the openings 80 to contact pad C5.

Capacitor 40 has a first terminal connected to the conductive track 61 and a second terminal connected to the conductive track 62. Capacitor 41 has a first terminal connected to the conductive track 62 and a second terminal connected to the conductive track 63. The antenna coil 30 has a first terminal 32 connected to the conductive track 62 and a second terminal 33 connected to the conductive track 63. Capacitor 41 is therefore arranged in parallel with the antenna coil 40 and capacitor 41 is arranged in series between the first terminal 32 of the antenna coil and terminal TA of the integrated circuit 20.

The integrated circuit 20, the antenna coil 30, the capacitors 40, 41, and the bonding wires are encapsulated in a polymeric material 72 extending over the substrate 70, such as resin or Polyvinyl Chloride (PVC), which forms the body 10 of the card.

The second conductive screen 73 is formed or deposited on the top side of the card. It may be a metal plate or may include one or more layers of a conductive material, for example a conductive paint.

In one embodiment, the card has a total thickness of 804 μm, the substrate 70 has a thickness of 100 μm, the first conductive screen 71 has a thickness of 18 μm, the second conductive screen 73 a thickness of 18 μm, and the antenna coil 30 including its core 31 has a thickness of 500 μm. The distance d1 between the center of the antenna coil and the first conductive screen 71 is 368 μm and the distance d2 between the center of the antenna coil and the first conductive screen 71 is 400 μm.

In a preferred embodiment, the integrated circuit 20 in configured to send data by inductive coupling using an active load modulation method. This method includes a step of emitting, in the presence of an external NFC device continuously emitting a first alternating magnetic field, bursts of a second alternating magnetic field. Such magnetic field bursts are perceived by the external device as a passive load modulation. This technique was proposed by the applicant in European patent EP 1 327 222 (U.S. Pat. No. 7,098,770 B2), see e.g., FIGS. 4A to 4E, page 8, table 4, paragraph 074.

As far as the sending of data by the card is concerned, this load modulation method allows a satisfactory maximum communication distance to be obtained in spite of the presence of the conductive screens 71, 73.

FIG. 2 is a block diagram showing an example architecture of the integrated circuit 20 implementing an active load modulation method. Also shown is an external device ED equipped with an antenna coil AC2.

The integrated circuit 20 includes a contact communication interface CINT, a processor PROC, and contactless communication circuitry.

The contact communication interface CINT is linked to the group 50 of contact pads C1-C8 and has an input/output connected to the processor PROC. Interface CINT ensures protocol management and data coding/decoding during a contact communication between the processor PROC and an external processor, such as the baseband processor of a mobile phone.

The contactless communication circuitry includes a coding circuit CCT, a decoding circuit DCT, a modulation circuit MCT, a demodulation circuit DMCT, a clock circuit CKCT, and a synchronous oscillator OSC. It also includes an antenna circuit ACT including the capacitors 40, 41 and the antenna coil 30 previously described.

During a contactless communication with the external device ED, the external device ED emits a magnetic field FLD1 oscillating at the working frequency. The processor PROC provides the contactless communication circuitry with data DTx to be sent to the external device ED, and processes data DTr provided by the contactless communication means, received from the external device.

During such contactless communication, an antenna signal AS is induced in the antenna circuit ACT by the magnetic field FLD1. The clock circuit CKCT receives the antenna signal AS and extracts therefrom an external clock signal CKe. The external clock signal CKe is, in general, of the same frequency as the carrier frequency.

The synchronous oscillator OSC receives the external clock signal CKe and supplies an internal clock signal CKi. The synchronous oscillator OSC has a synchronous operating mode where the phase and the frequency of the internal clock signal CKi are slaved to those of the external clock signal, and a free-oscillation operating mode where the external clock signal no longer drives the oscillator.

When the external device ED sends data DTr to the integrated circuit 20, it modulates the magnetic field FLD1 by means of a data-carrying modulation signal MS(DTr). Since the induced antenna signal AS is the image of the magnetic field, the data-carrying modulation signal is also found in the antenna signal AS.

The demodulation circuit DMCT extracts from antenna signal AS the modulation signal MS(DTr), and supplies it to the decoding circuit DCT. The decoding circuit DCT decodes the data DTr and supplies them to the processor PROC.

When the integrated circuit 20 sends data DTx to the external device ED, the data to be sent DTx are first supplied to the coding circuit CCT and the synchronous oscillator OSC is set in the free-oscillation operating mode. The coding circuit CCT supplies a data-carrying modulation signal MS(DTx) to the modulation circuit MCT.

The modulation circuit MCT combines the data-carrying modulation signal MS(DTx) and the internal clock signal CKi and supplies an active load modulation signal LS to the antenna circuit. The active load modulation signal LS includes bursts of the internal clock signal CKi separated by unmodulated periods where the signal LS has a default value. For example, the modulation circuit MCT supplies the internal clock signal CKi as modulation signal LS when MS(DTx)=1, and sets its output to 0 when MS(DTx)=0. Thus, signal LS is 0 when the signal MS(DTx) is 0, and copies the signal CKi when signal MS(DTX) is 1. The antenna circuit ACT thus receives bursts of internal clock signal CKi and the antenna coil 30 emits corresponding bursts of a magnetic field FLD2. These magnetic field bursts are detected by the external device ED as a passive load modulation. The external device extracts from its antenna coil AC2 the data-carrying modulation signal MS(DTx), then decodes the data DTx sent by the integrated circuit 20.

FIGS. 3A to 3E schematically illustrate a data transmission sequence where data DTr are received by the integrated circuit 20 (left half of the figures) and a data transmission sequence where data DTx are sent by the integrated circuit 20 (right half of the figures). FIG. 3A shows the antenna signal AS. FIG. 3B shows the modulation signal MS(DTr). FIG. 3C shows the internal clock signal CKi. FIG. 3D shows the modulation signal MS(DTx), and FIG. 3E shows the active load modulation signal LS.

When the external device ED sends data DTr, it modulates the amplitude of the magnetic field FLD1 with a modulation depth that depends on the chosen communication protocol. As shown on left side of FIG. 3A, the antenna signal AS shows modulated periods M where its amplitude has a minimum value a1, and unmodulated periods UM where its amplitude has a maximum value a2.

As shown on right side of FIG. 3A, when the integrated circuit 20 sends data DTx, the antenna signal shows unmodulated periods UM of the same amplitude a2 as during the reception of data, and overvoltage periods OM where its amplitude has a boosted value a3. During the overvoltage periods, the amplitude of the antenna signal is boosted by the injection of the internal clock signal CKi into the antenna circuit ACT, and signal CKi is superposed on the signal induced in the antenna circuit ACT by the external magnetic field FLD1. The injection of the internal clock signal CKi causes bursts of magnetic signal FLD2 to be emitted by the card.

When the card is in use after having been placed in the card connector of a handheld device, it is generally close to the printed circuit board (PCB) of the device, at a vertical distance or "Z-distance" from the latter, with respect to the XY plane of the printed circuit board. Such a distance is generally unpredictable for the card manufacturer as far as the fabrication of "generic" cards is concerned (i.e., cards intended for any type of mobile phone). This Z-distance depends on the structure of the device and the location of the card connector. The card connector may be mounted directly on the PCB or arranged several millimeters above. Also unpredictable is the XY location of the card with respect to the PCB, as well as the orientation of the magnetic axis of the antenna coil with respect to the edges of the PCB.

During a contactless communication, the maximum communication distance between the card and the external device is affected by different factors and physical phenomena which include:

1) the influence of metallic materials located below the card on the tuning frequency of the antenna circuit. These metal materials may include the metal parts of the PCB and possible metal components thereon;

2) the influence of metallic materials located above the card on the tuning frequency of the antenna circuit. These metal materials may include the metal parts of a battery arranged over the card;

3) the apparition of eddy currents in the PCB. Such eddy currents tend to neutralize the magnetic field FLD1 emitted by the external device ED by generating an induced local counter magnetic field due to Lenz's law. They generally circulate at the periphery of the PCB and the counter magnetic field appears near the edges of the PCB;

4) the apparition of eddy currents in the first and second conductive screens 71, 73, which also generate local counter magnetic fields proximate to each screen.

The effects of these different phenomena on the functioning of the card 1 will now be described in a simplified manner, in light of examples of arrangement of the card 1 within a handheld device.

FIG. 4 schematically shows the NFC card 1 mounted or inserted in a handheld device HD according to a first arrangement. The handheld device HD may be a mobile telephone, a personal digital assistant (PDA), and the like. The handheld device includes a printed circuit board PCB1 including metal parts such as conductive tracks on which electronic components are mounted (not shown). It is assumed for example that a host processor HP is mounted on the board PCB1, such as the baseband processor of a mobile phone. The host processor HP has inputs/outputs linked to the group 50 of contact pads of the card. FIG. 4 also shows the external device ED emitting the magnetic field FLD1.

In this example, the card 1 is arranged so that its bottom side, including the first conductive shield 71, extends above the board PCB1, and so that its magnetic axis MA is close and perpendicular to one edge of the board PCB1. For the sake of simplicity, FIG. 4 only shows the antenna coil 30, the antenna core 31, the group 50 of contact pads, and the conductive screen 71; the other elements of the card are not shown.

Figure 5:
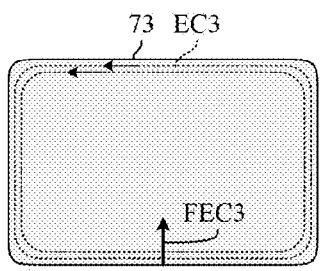
FIG. 5 shows one embodiment of a conductive screen of the NFC card.

In the presence of the magnetic field FLD1, eddy currents EC1 are induced and circulate on the periphery of the printed circuit board PCB1, assuming that the latter has a large ground plane. Eddy currents EC1 generate a counter magnetic field FEC1 that tends to neutralize the magnetic field FLD1. Eddy currents EC2 in the conductive screen 71 of the card also generate a counter magnetic field FEC2 which has the same polarity as the counter magnetic field FEC1 seen from the antenna coil 30. As shown in FIG. 5 by a bottom view of the conductive screen 73 (i.e., the conductive screen 73 seen from the antenna coil), eddy currents EC3 in the conductive screen 73 also generate a counter magnetic field FEC3 which has a polarity opposite to that of the counter magnetic fields FEC1 and FEC2, seen from the antenna coil 30. It is assumed here that if the screens have substantially the same dimensions and the same electrical conductivity, the counter magnetic fields FEC2 and FEC3 cancel each other in the region between the screens 71, 73 where the antenna coil 30 is arranged.

It has been observed that when the card is arranged as shown, i.e., so that the antenna coil is near one of the edges of the PCB with its magnetic axis perpendicular to the edge, and when the Z-distance is small, the magnitude of the counter magnetic field FEC1 prevails over that of the external magnetic field FLD1 and improves the reception of data DTr sent by the external device ED. Therefore, the counter magnetic field FEC1 is sensed by the antenna coil 30 instead of the original magnetic field FLD1, allowing the card 1 to receive data from the external device ED with a greater maximum communication distance. If the antenna core 31 is made of a highly permeable material such as ferrite, the core concentrates the magnetic field lines and the maximum communication distance is further increased.

The first and second conductive screens also act as shields to make the performance of the NFC card less dependent on the metallic environment situated below and above it. In particular, since the tuning frequency of the antenna circuit is set in the presence of the top conductive screen 73, the detuning effect caused by the presence of a battery above the card is greatly attenuated.

Different tests were performed to evaluate the effect of the conductive screens on the performances of the card during a contactless communication.

An NFC card not including an electrically conducting screen was studied first. The card was placed directly on a printed circuit board, then tuned to 13.56 MHz. A magnetic field of 13.56 MHz was emitted and the voltage of the antenna signal was measured. Next, the card was placed 2 mm above the printed circuit board without a re-tuning of the antenna coil. The tuning frequency was diminished, and the voltage of the antenna signal was approximately 33% less than that of the first case.

These measures were repeated with the NFC card 1 including the first conductive screen 71 only (the second screen being intended for cards destined to be arranged under a battery or metal parts). The card 1 was placed directly on the printed circuit board, and then tuned to 13.56 MHz. The voltage of the antenna circuit was identical to that obtained without the conductive screen 71. When the card 1 was placed 2 mm above the printed circuit board PCB, the tuning frequency did not change, nor did the voltage of the antenna signal.

Figure 6:
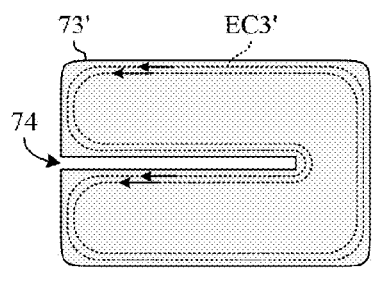
FIGS. 6 and 7 show other embodiments of the conductive screen.

FIG. 6 shows a first variant 73' of the second conductive screen. The screen 73' has a longitudinal slot 74 that modifies the circulation of the eddy currents EC3. The eddy currents follow the edges of the screen then follow the edges of the slot, and therefore follow a U-shaped path instead of a loop around the periphery of the screen.

Figure 7:
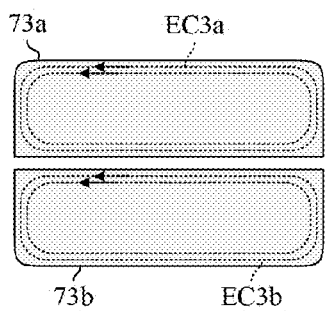

FIG. 7 shows a second variant of the second conductive screen. The screen is divided into two parts forming two sub-screens 73a, 73b. Each sub-screen 73a, 73b is traversed by eddy currents EC3a, EC3b which circulate in loops that are half the size of the loop followed by eddy current EC3 in FIG. 5.

These variants of the second screen 73 allow the counter magnetic field FEC3 generated by the screen to be reduced. Consequently, the counter magnetic field FEC2 generated by the first screen 71 is not canceled by the counter magnetic field FEC3 and is added to the counter magnetic field FEC1 generated by the printed circuit board PCB1.

In other embodiments, the screen 73 may have several slots perpendicular to its edges or may be divided into a greater number of sub-screens, so as to further reduce the surface of the areas surrounded by eddy currents.

Figure 8:
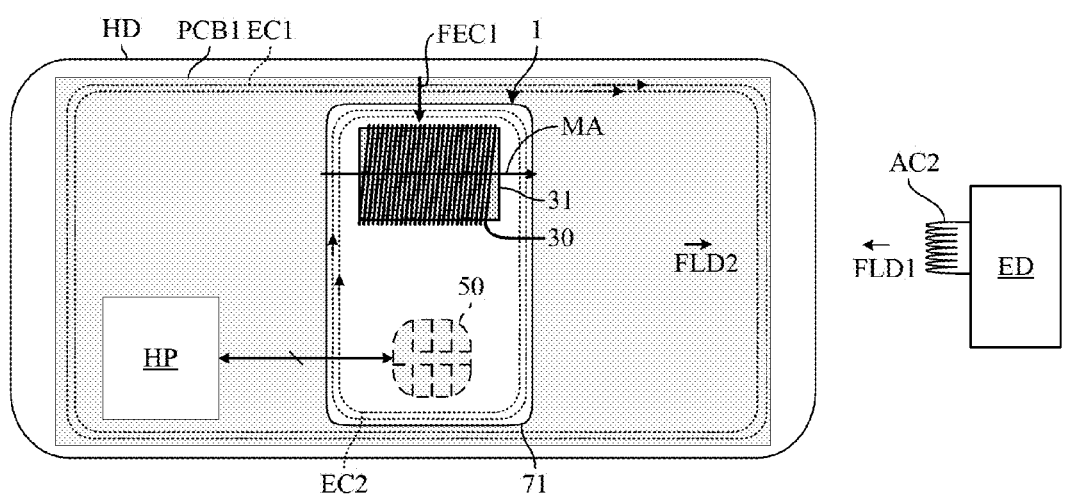
FIG. 8 shows a second arrangement of the NFC card inside a handheld device.

FIG. 8 schematically shows the NFC card 1 mounted or inserted in the handheld device HD according to a second arrangement. FIG. 8 is similar to FIG. 4 except that the arrangement of the card is such that the magnetic axis MA of the antenna coil 30 is parallel to an edge of the printed circuit board PCB1 and therefore perpendicular to the counter magnetic field FEC1 generated by the eddy currents EC1.

With such an arrangement, the local counter magnetic field FEC1 does not pass through the antenna coil 30, and does not increase the maximum communication distance between the card and the external device ED. The reception of data sent by the external device is, in this case, based on the sensing of the external magnetic field FLD1 by the antenna coil.

It can be noted that, contrary to the maximum communication distance for receiving data, when the card sends data by emitting bursts of magnetic field FLD2 the maximum communication distance for sending data is not very sensitive to the XYZ location of the antenna coil with respect to the printed circuit board. Thus, the maximum communication distance is approximately the same in FIG. 4 and in FIG. 8 as far as the sending of data to the external device ED is concerned.

Figure 9A:
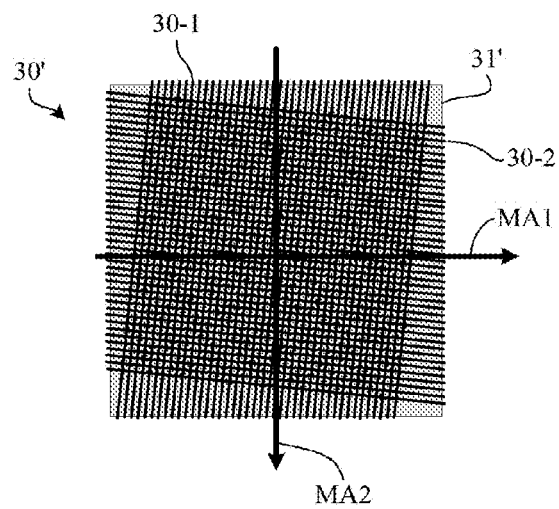
FIGS. 9A, 9B show embodiments of an antenna coil of the NFC card.
Figure 9B:
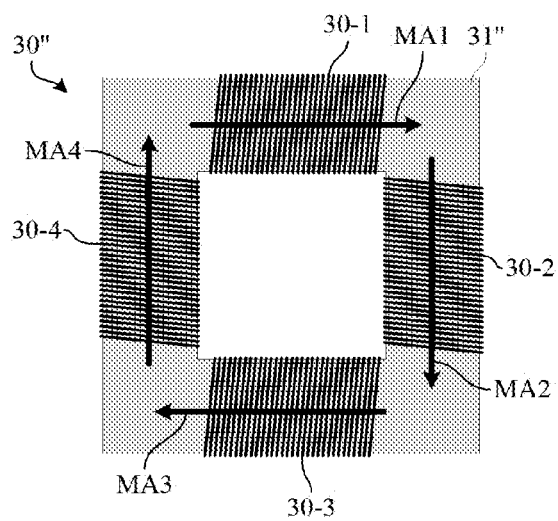

FIGS. 9A and 9B show two embodiments 30', 30" of the antenna coil provided to improve the capability of card to sense the counter magnetic field FEC1 when it is not known in advance how the card will be arranged with respect to the printed circuit board PCB1. In FIG. 9A, the antenna coil 30' includes two coils 30-1, 30-2 wound around a common core 31'. Coil 30-1 has a magnetic axis MA1 which is perpendicular to a magnetic axis MA2 of coil 30-2.

In FIG. 9B, the antenna coil 30" includes four coils 30-1, 30-2, 30-3, 30-4 in series wound around a common square ring core 31". Coil 30-1 is wound around a first segment of the square ring core 31" and has a magnetic axis MA1. Coil 30-2 is wound around a second segment of the square ring core 31" and has a magnetic axis MA2 perpendicular to the magnetic axis MA1. Coil 30-3 is wound around a third segment of the square ring core 31" and has a magnetic axis MA3 perpendicular to the magnetic axis MA2. Coil 30-4 is wound around a fourth segment of the square ring core 31" and has a magnetic axis MA4 perpendicular to the magnetic axis MA3.

In this manner, the antenna coil 30' or 30" can capture the counter magnetic field FEC1 through one of the two coils 30-1, 30-2 (FIG. 9A) or through the four coils 30-1 to 30-4 (FIG. 9B), no matter whether the card is arranged as shown in FIG. 4 or in FIG. 8.

Figure 10:
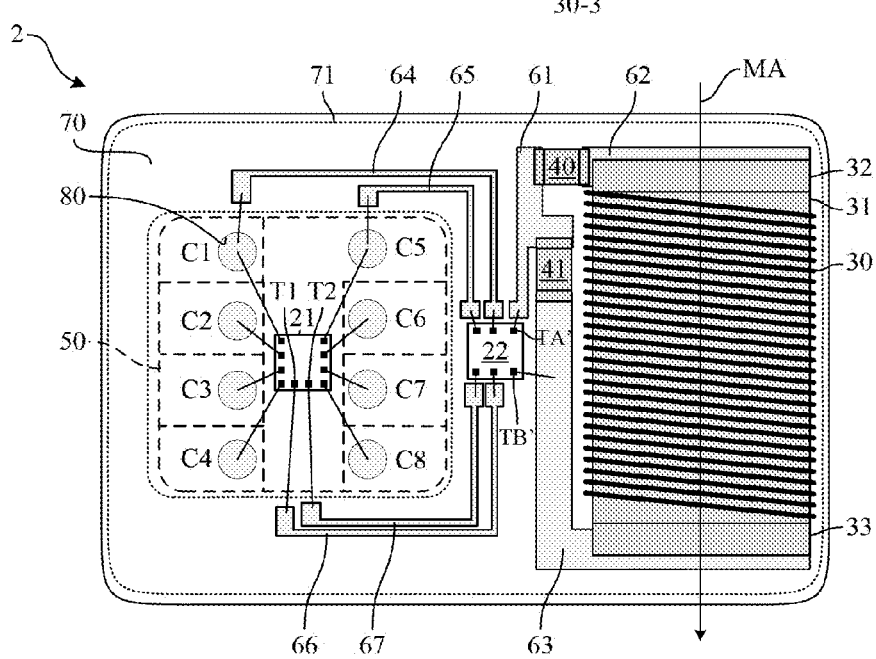
FIG. 10 is a top view of a second embodiment of an NFC card according to the invention.

FIG. 10 is a top view of another embodiment of an NFC card 2 according to the invention, internal elements of the card being shown through a material in which they are embedded.

The card 2 includes similar elements as card 1, designated by the same references, in particular the antenna coil 30 wound around the core 31, the capacitors 40, 41, and the group 50 of contact pads, here ISO 7816 pads C1-C8. The card 2 has also the bottom conductive screen 71, and the top conductive screen 73 (not shown).

As previously described, capacitor 40 has a first terminal connected to the conductive track 61 and a second terminal connected to the conductive track 62. Capacitor 41 has a first terminal connected to the conductive track 62 and a second terminal connected to the conductive track 63. The antenna coil 30 has a first terminal 32 connected to the conductive track 62 and a second terminal 33 connected to the conductive track 63.

Card 2 essentially differs from card 1 in that it includes two integrated circuits 21, 22 on semiconductor chips. The integrated circuit 21 is designed to establish a contact communication with the processor of a handheld device, such as the processor HP in FIG. 4, and has terminals linked to the contact pads C1-C8. The integrated circuit 22 is designed to establish a contactless communication with an external device, such as device ED in FIG. 4, and is linked to the antenna coil 30. Both integrated circuits 21, 22 are also interconnected so that they can communicate between themselves.

The integrated circuit 21 may be configured to manage contactless transactions through the integrated circuit 22, which may be configured to operate as a contactless coupler. Alternatively, the integrated circuit 22 may be configured to manage contactless transactions and to "refer" to the integrated circuit 21 when some specific steps are to be performed during a transaction, such as an authentication step.

The integrated circuit 21 is arranged on the substrate 70 above the group 50 of contact pads, and has terminals wire bonded to the contact pads C1-C8 through openings 80 in the substrate 70. The integrated circuit 21 also includes two data bus terminals T1, T2 that are wire bonded to two conductive tracks 66, 67.

The integrated circuit 22 is arranged on the substrate 70, between the integrated circuit 21 and the antenna coil 30. It includes a terminal TA' wire bonded to the conductive track 61, a terminal TB' wire bonded to the conductive track 63, a power supply terminal wire bonded to a conductive track 64 of the card, a ground terminal wire bonded to a conductive track 65 of the card, a data bus terminal wire bonded to the conductive track 66, and a data bus terminal wire bonded to the conductive track 67. The conductive track 64 is wire bonded to contact pad C1, and the conductive track 65 is wire bonded to contact pad C6.

It will clearly appear to the skilled person that an NFC card according to the present invention is susceptible of various other embodiments. Different known methods in the field of chip card manufacturing may be used to manufacture different embodiments of a card according to the invention. In some embodiments, the conductive screen(s) may be embedded within the body of the card and may extend near one side of the card. The top and/or bottom faces of the card may be not planar. The screen(s) may be curved instead of planar. The screen(s) may extend over only a part of the surface of the card. The group of contact pads may include only two contact pads to power the card when it emits the magnetic field. The card may also be powered by a battery and may not have any contact pads. The card may also be purely passive and configured to send data by passive load modulation, and extract a power supply voltage from the external magnetic field FLD1.

In addition, in the present description and the claims, the term "NFC" should be taken to mean any type of contactless communication performed by inductive coupling, whatever the protocol used and the working frequency. Furthermore, the term "NFC card" should be taken to mean any type of handheld support having NFC capabilities.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An NFC card comprising:
    an antenna circuit comprising an antenna coil having at least one magnetic axis,
    at least one integrated circuit linked to the antenna circuit, and
    at least one electrically conductive screen extending near the antenna coil, which does not cross the magnetic axis
    wherein the magnetic axis of the antenna coil is substantially parallel to at least one side of the card, and the card does not include any magnetically permeable material between the at least one conductive screen and the antenna coil.

2. The NFC card according to claim 1, wherein the antenna circuit has a tuning frequency which has been set in the presence of the at least one electrically conductive screen, and does not detune when a metallic element is placed near the electrically conductive screen.

3. The NFC card according to claim 1, further comprising contact pads arranged on a first side of the card.

4. The NFC card according to claim 3, wherein the conductive screen extends on or near the first side of the card.

5. The NFC card according to claim 3, wherein the conductive screen extends on or near a second side of the card.

6. The NFC card according to claim 1, wherein the at least one electrically conductive screen comprises a first conductive screen extending on one side of the antenna coil without crossing its magnetic axis, and a second conductive screen extending on another side of the antenna coil without crossing its magnetic axis.

7. The NFC card according to claim 1, wherein the antenna coil is wound around a magnetically permeable core.

8. The NFC card according to claim 1, in which the integrated circuit is configured to implement an active load modulation method comprising emitting bursts of magnetic field by way of the antenna coil when data are to be sent, in order to compensate the negative effect of the at least one screen on the maximum communication distance offered by the card for the sending of data by load modulation.

9. The NFC card according to claim 1, wherein the antenna coil comprises at least two coils in series, the coils having non-parallel magnetic axes, to enhance the sensing of a counter magnetic field generated by eddy currents when the card is arranged near a printed circuit board in the presence of an external magnetic field.

10. The NFC card according to claim 1, wherein the at least one conductive screen comprises at least one slot to reduce the effect of eddy currents circulating in the conductive screen in the presence of an external magnetic field.

11. The NFC card according to claim 1, wherein the at least one conductive screen is split into at least two sub-screens to reduce the effect of eddy currents circulating in the conductive screen in the presence of an external magnetic field.

12. A method for tuning an antenna coil of an NFC card, the method comprising:
    providing a card according to claim 1, and
    setting a tuning frequency of the antenna circuit in the presence of the at least one electrically conductive screen.

13. A method for performing a contactless communication between an NFC card and an NFC external device (ED), the method comprising:
    providing an NFC card comprising:
        an antenna circuit comprising an antenna coil having at least one magnetic axis,
        at least one integrated circuit linked to the antenna circuit, and
        at least one electrically conductive screen extending near the antenna coil, which does not cross the magnetic axis,
        wherein the magnetic axis of the antenna coil is substantially parallel to at least one side of the card, and the card does not include any magnetically permeable material between the at least one conductive screen and the antenna coil,
    setting a tuning frequency of the antenna circuit of the card in the presence of the at least one electrically conductive screen,
    emitting a first oscillating magnetic field with the external device,
    placing the card near the edges of a printed circuit board, and
    using the conductive screen to protect the tuning frequency of the antenna circuit against the detuning effect of the printed circuit board, to increase the maximum communication distance between the card and the external device.

14. The method according to claim 13, further comprising sensing, with the antenna coil of the NFC card, a counter magnetic field generated by eddy currents in the printed circuit board, to increase the maximum communication distance between the card and the external device.

15. The method according to claim 13, further comprising emitting bursts of a second oscillating magnetic field (FLD2) with the antenna coil of the NFC card, while the external device (ED) emits the first oscillating magnetic field (FLD1), to transfer data (DTx) from the card to the external device.

* * * * *